United States Patent [19]

Iketaki

[11] Patent Number: 5,163,078
[45] Date of Patent: Nov. 10, 1992

[54] MULTILAYER FILM REFLECTING MIRROR FOR X-RAYS

[75] Inventor: Yoshinori Iketaki, Oume, Japan

[73] Assignee: Olympus Optical Co., Ltd., Tokyo, Japan

[21] Appl. No.: 781,912

[22] Filed: Oct. 24, 1991

[30] Foreign Application Priority Data

Aug. 2, 1991 [JP] Japan .................. 3-194329

[51] Int. Cl.[5] ............................................. G21K 1/06
[52] U.S. Cl. ........................................ 378/85; 378/43;
378/70; 427/160; 428/220; 428/912.2
[58] Field of Search ............... 378/84, 85, 70, 82,
378/43, 210, 145, 49; 427/160, 39; 428/220,
912.2, 627, 698, 704

[56] References Cited

U.S. PATENT DOCUMENTS

| 4,684,565 | 8/1987 | Abeles et al. | 378/84 |
| 4,693,933 | 9/1987 | Keem et al. | 378/43 |
| 4,727,000 | 2/1988 | Ovshinsky et al. | 378/84 |
| 4,785,470 | 11/1988 | Wood et al. | 378/84 |
| 4,916,721 | 4/1990 | Carr et al. | 378/84 |

OTHER PUBLICATIONS

T. Namioka, "Current Research Activities in the Field of Multilayers for Soft X-rays in Japan", Revue Phys. Appl. 1988, pp. 1711-1726.
T. Namioka et al. Developments of Light Sources and Optical Systems for Soft X-Ray Lithography, p. 23 4.2 (Japan, 5985007).
H. Yamashita, O plus E, Feb. 1987 pp. 67-83 (p. 67 1).
Sadao Aoki, X-Ray Optical Elements and Their Applications, 1986, pp. 342-350 (p.346 48) 3.2.

Primary Examiner—Constantine Hannaher
Assistant Examiner—Kim-Kwok Chu
Attorney, Agent, or Firm—Cushman, Darby & Cushman

[57] ABSTRACT

An X-ray multilayer film reflecting mirror comprises a plurality of substance layers formed on a substrate to be applied to X-rays having a wavelength of 100 Å or less so that a deviation $\Delta$ of the film thickness of each layer from a standard value is within a range defined by $$\left| \frac{0.03}{\sin^2 \theta} \lambda \right| \geq \Delta$$

where $\theta$ is the grazing angle of an X-ray being incident and $\lambda$ is the wavelength of the X-ray. Thus, the multilayer film reflecting mirror having the reflectance which is advantageous in practical use can be stably provided, and a product yield is improved.

8 Claims, 9 Drawing Sheets

101 LAYERS
$\phi = 0°$
$\lambda = 39.8 Å$
$Sc = 8.6 Å$
$Ni = 11.4 Å$

101 LAYERS
$\phi = 0°$
$\lambda = 39.8 Å$
$Sc = 13.4 Å$
$Ni = 9.7 Å$

MULTILAYER FILM REFLECTING MIRROR FOR X-RAYS

BACKGROUND OF THE INVENTION a) Field of the Invention

This invention relates to a multilayer film reflecting mirror suitable to an optical element for use in an X-ray optical system.

b) Description of the Prior Art

Recently, attention has come to be attracted to an artificial grating, as a reflecting mirror for soft X rays, comprising thin films laminated with film thicknesses between several and several hundred angstroms. It is usual for the lamination technique of the artificial grating to alternately laminate the thin film of a substance A with a low refractive index and that of a substance B with a high refractive index, over the range of several tens of layers to several hundred layers, in a soft X-ray region. For instance, W (tungsten), Ni (nickel) or Mo (molybdenum) is known as the substance A, while C (carbon), B (boron), Be (beryllium) or Si (silicone) as the substance B [T. Namioka, Revue Phys. Appl., Vol. 23 (1988), pp. 1711-1726]. In the case where the substances A and B are alternately built up, various methods are known, for example, of laminating periodically individual substance layers whose film thicknesses are made constant and of laminating the film layers which are optimized for each layer [Takeshi Namioka et al., "Developments of Light Sources and Optical systems for Soft X-ray Lithography", Report of Research by Scientific Research-Aid Fund for the 1985 Fiscal Year (Test Research (2)), pp. 1-36, 1986]. Additionally, for the purpose of preventing individual substances from diffusing at the interface between the layers of the substances A and B, an artificial grating is also devised which comprises at least three kinds of substances by providing a buffer layer, between the layers of the substances A and B, constructed of other substance (U.S. Pat. No. 4,693,933). For a film fabrication, approaches, such as electronic beam evaporation, sputtering and laser beam techniques, are known and the examples of the artificial grating using these film fabrication techniques are also reviewed [H. Yamashita, O plus E, Feb., 1987, pp. 67-83; T. Namioka et al., Journal of the Japanese Society of Precision Engineering, Vol. 11 (1986), pp. 16-18]. To secure a sufficient reflectance in the soft X-ray region, however, a working technique with a high degree of accuracy is required and hence there is the report that a surface roughness of 1 nm or less is required for a substrate and that of 1.4 Å or less for the interfaces between individual layers (U.S. Pat. No. 4,727,000).

Consideration is also given to theoretically design and evaluate the reflectance of the multilayer film reflecting mirror making use of the artificial grating mentioned above, and in general, when X rays in a long wavelength region are incident and in a grazing incidence region, the difference in reflectance between a design value and a measured value is small. In such instances, it is effective to apply Fresnel's recurrence formula as a theoretical model. FIG. 1 shows an optical model of the multilayer film reflecting mirror, in which reference symbol $R_{m-1}$ represents the complex amplitude reflectance in the case where the substances are laminated to the $(m-1)$-th layer for film fabrication and $N_{m-1}$ the complex index of refraction of the $(m-1)$-th layer. The complex amplitude reflectance in the case where the substance having a complex index of refraction $N_m$ is further laminated thereon, with a thickness of $d_m$, is designated by $R_m$, which is given by $$R_m = \frac{r_m(1 - r_m R_{m-1}) + (R_{m-1} - r_m)\exp(-i\delta_m)}{1 - r_m R_{m-1} + (R_{m-1} - r_m)\exp(-i\delta_m)} \quad (1)$$

where $r_m$ is the Fresnel coefficient relating to a vacuum of the m-th layer of a new lamination, $\delta_m$ is the phase difference between both ways in the m-th layer, and i is the unit of the imaginary number [T. Namioka, Revue Phys. Appl., Vol. 23 (1988), pp. 1711-1726]. For the p-polarized light component.

$$r_m = \frac{N_m \cos\phi - \cos\phi_m}{N_m \cos\phi + \cos\phi_m} \quad (2)$$

For the s-polarized light component, $$r_m = \frac{\cos\phi - N_m \cos\phi_m}{\cos\phi + N_m \cos\phi_m} \quad (3)$$

where $\phi$ is the angle of incidence at which X rays are incident on the multilayer film through the vacuum and $\phi_m$ is the complex angle of refraction. Also, when the wavelength is taken as $\lambda$, the phase difference $\delta_m$ is given by $$\delta_m = \left(\frac{4\pi}{\lambda}\right) N_m d_m \cos\phi_m \quad (4)$$

If, therefore, the substrate not shown is taken as $m=0$ and Equation (1) is used, in turn, from the 0-th layer to the m-th layer to determine $R_m$, a desired reflectance of the multilayer film reflecting mirror can be calculated.

FIG. 2 shows the design value and the measured value of the reflectance in the case where X rays with a wavelength of 1.5 Å are incident while the angle of diffraction is made to change, on the multilayer film reflecting mirror comprising W of a film 17.3 Å thick and C of a film 34.7 Å thick, built on the substrate into 11 layers. In this case, as will be obvious from FIG. 2, the difference in reflectance between the design value and the measured value is extremely small. If, however, the wavelength of X rays to be incident is shorter or X rays enter at the normal incidence, the difference will become larger. This is attributed to two points indicated below.

(a) In the case of the incidence of X rays having a shorter wavelength or at the normal incidence, the film thickness per layer must be diminished. This makes it difficult to uniform the film thickness with the deterioration of reflectance.

(b) In the case of the incidence of X rays having a shorter wavelength or at the normal incidence, the interference condition of the X rays become severe, with the result that the roughness of each interface is more liable to affect the X rays.

Most of the multilayer film reflecting mirrors of the prior art mentioned above have been fabricated in view of the case where X rays are incident principally at a grazing angle of 20° or less in the grazing incidence region or where X rays having long wavelengths of 100 Å or more are incident in the normal incidence region. These mirrors can bring about the reflectance close to the design value if the roughness of the interface is sufficiently controlled. When X rays of short wavelengths are incident in the normal incidence region, however, problems are caused by the property of interference of X rays, due to the reasons of the above points (a) and (b), within the multilayer film reflecting mirror. In a multilayer film reflecting mirror illustrated in FIG. 3 which comprises the thin films of two kinds of substances A and B different in refractive index from each other, laminated alternately with the thicknesses of $d_1$ and $d_2$, respectively, when the thickness of a pair of layers (which will be hereinafter referred to as periodic thickness) is represented by d, the wavelength of an X ray by $\lambda$, and the grazing angle by $\theta$, Bragg's condition becomes $$2d \sin \theta = \lambda \tag{5}$$

and the periodic thickness d is expressed by $$d = \frac{\lambda}{2 \sin \theta} \tag{6}$$

In other words, the periodic thickness reduces as the wavelength $\lambda$ becomes short and the incident angle is small. Consequently, incident X rays interfere within the multilayer film reflecting mirror, so that the highest reflectance needs to control correctly the thickness of the multilayer film with the accuracy corresponding to the periodic thickness d.

In the above case, however, no discussion is made in detail as to how the accuracy of the film thickness should be controlled under any condition. FIG. 4 depicts the design example of the multilayer film reflecting mirror comprising Ni and Sc built up of 201 layers, with the film thicknesses of 8.2 Å and 11.8 Å, respectively. It is constructed so that when the reflecting mirror is fabricated, an actual film thickness generally have a tolerance $\Delta d$ with respect to the design value of each film thickness. The tolerance $\Delta d$ may be assumed to arise at random in the probability according to the normal distribution given by $$f(\Delta d) = \frac{1}{\sqrt{2 \pi} \sigma} \exp\left[ - \frac{\Delta d^2}{2 \sigma^2} \right] \tag{7}$$

where $\sigma$ is the deviation. According to Equation (7), the value of $\Delta d$ of $-\sigma \leq \Delta d \leq \sigma$ appears in the probability of 68%. FIG. 5 shows the results of simulation of the reflectances in the cases where X rays having a wavelength of 39.8 Å are incident while the incident angle is made to change, on the multilayer film reflecting mirror fabricated so that the film thickness has the tolerance $\Delta d$ for the design value and where the deviation $\sigma$, that is, the accuracy of the film fabrication is changed. According to FIG. 5, as the deviation $\sigma$ increases from 0 Å to 0.4 Å, the reflectance materially reduces, and consequently, there is the feasibility that even the reflecting mirror fabricated with a deviation of about 0.4 Å cannot be utilized as a useful one. In the case where, as mentioned above, the film thickness deviates at random from the design value in accordance with the normal distribution, some multilayer film reflecting mirrors fabricated will exhibit remarkably low reflectances in view of the theory of probability. Thus, the multilayer film reflecting mirrors of the prior art in practical fabrication have been difficult to bring about the stabilization of their qualities and the improvement in a product yield.

SUMMARY OF THE INVENTION

It is, therefore, an object of the present invention to provide a multilayer film reflecting mirror which has a practical reflectance and can be fabricated in a high probability, with the resultant improvement of a product yield.

To achieve this object and in accordance with the present invention, the multilayer film reflecting mirror comprises a plurality of substance layers built on a substrate to be applied to X rays having wavelengths of 100 Å or less so that a deviation $\Delta$ from the design value of the film thickness of each layer is controlled within a range defined by $$\left| \frac{0.03}{\sin^2 \theta} \lambda \right| \geq \Delta \tag{8}$$

where $\theta$ is the grazing angle of an X ray being incident and $\lambda$ is the wavelength of the X ray.

The foregoing will be explained in detail below.

FIG. 6 is a conceptional view showing the reflecting action where X rays are incident on the multilayer film reflecting mirror comprising substances A and B alternately laminated, in which reference symbols $L_1$ and $L_2$ designate X rays. In this figure, in order that X rays having the wavelength $\lambda$ interfere within the multilayer film reflecting mirror to secure a full reflectance, it is necessary to satisfy the following relationship, from Bragg's condition:

$$\lambda = 2d \sin \theta \tag{9}$$

where d is the periodic thickness (the sum of thicknesses of the substances A and B) and $\theta$ is the grazing angle.

That is, in order that the optical path difference between the X rays $L_1$ and $L_2$ is made equal to $\lambda$, it is necessary to control each periodic thickness. The accuracy of this thickness control is indicated by an optical path length S along which the X ray travels one period within the multilayer film, from Equation (9), and which corresponds to the length connecting points F, G, and H in FIG. 6. Since the refractive index of the multilayer film reflecting mirror is nearly unity in the X-ray region, the optical path length S is expressed by $$S = \overline{FGH} = \frac{2d}{\sin \theta} \tag{10}$$

If Equation (9) is used, $$S = \overline{FGH} = \frac{\lambda}{\sin^2 \theta} \tag{11}$$

The goodness of the interference and reflectance of the multilayer film reflecting mirror depends basically on how the thickness of each layer is accurately formed with respect to the optical path length S calculated from the incidence condition of the X ray. Further, the accuracy in fabricating the multilayer film is determined relative to the optical path length S.

Hence, if the optical path length S to be calculated is obtained, the optimum design value of each film thickness will be determined, and by defining the deviation of each film thickness in the film fabrication, within a certain range, produced at random from the optimum design value on the basis of the optical path length S, the fabrication of the multilayer film reflecting mirror which has practical use can be realized in a high probability. That is, Equation (8) is obtained.

Equation (8) allows the deviation from the design value, up to 3% of the optical path length S along which the X ray travels one period within the multilayer film. Thus, even though the tolerance of each film thickness is produced at random in the film fabrication while having the deviation of Δ from the optimum design value, in the probability according to the normal distribution given by Equation (7), the multilayer film reflecting mirror having the reflectance of at least 50% of the design value can be fabricated in the probability of 30% or more.

Also, even in a method for the design of a nonperiodic structure in which the thickness of each layer of the multilayer film reflecting mirror is optimized, the practical multilayer reflecting mirror can be fabricated on the same condition as the design of the periodic structure, provided the film thickness of each layer is set within the tolerance defined by Equation (8).

Additionally, in actual coatings applied by the approaches such as electronic beam evaporation and sputtering techniques, the film thickness can be monitored within 0.1 Å tolerance by the use of a crystal oscillator and an ellipsometer, so that the film fabrication is possible within the tolerance defined by Equation (8).

The structure of this type of the multilayer film reflecting mirror is peculiarly suitable for the case where the reflecting mirror is formed by the multilayer film with which the substrate having a curvature is coated. As the examples of optical systems constructed using the reflecting mirrors according to the present invention, the soft X-ray imaging elements of typical Schwarzschild and Walter optical systems are illustrated in FIGS. 7A and 7B, respectively. The Schwarzschild optical system is constructed by the combination of two concave mirrors with a convex mirror, while on the other hand, the Walter optical system uses the combination of the reflecting mirrors comprised of curved surfaces represented by secondary functions of paraboloids and ellipsoids. For the soft x-ray region, each surface is coated with the multilayer film mirror in the attempt to improve the transmission efficiency of the entire optical system. With 60 Å or smaller wavelengths in particular, the surface is coated with the multilayer film which utilizes W and C, and Ni excellent in optical constant as in Ni and Ti, and Ni and Sc. Each optical system of the foregoing reflects soft X rays at least twice, so that the deviation of the thickness of the multilayer film from the design value will remarkably decrease the transmission efficiency of the entire optical system. As such, the present invention contributes also to the solution of such a problem.

This and other objects as well as the features and the advantages of the present invention will become apparent from the following detailed description of the preferred embodiment when taken in conjunction with the accompanying drawings.

DETAILED DESCRIPTION OF THE PREFERRED EMBODIMENTS

Figure 1:
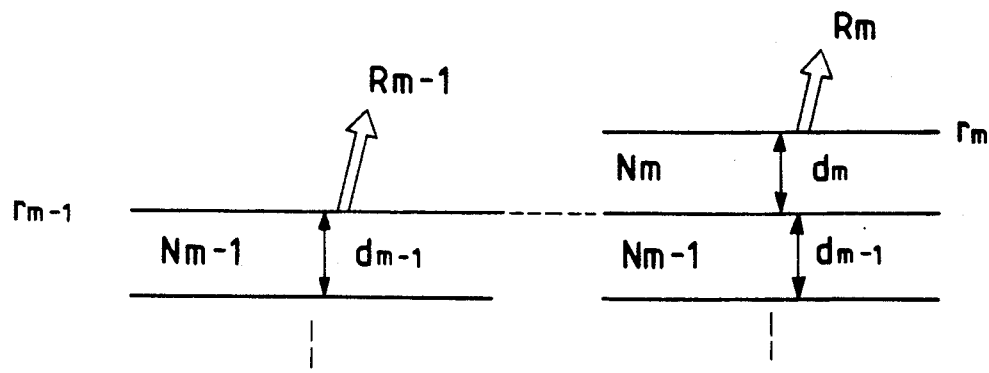
FIG. 1 is a view showing the optical model of one example of multilayer film reflecting mirrors of the prior art.
Figure 2:
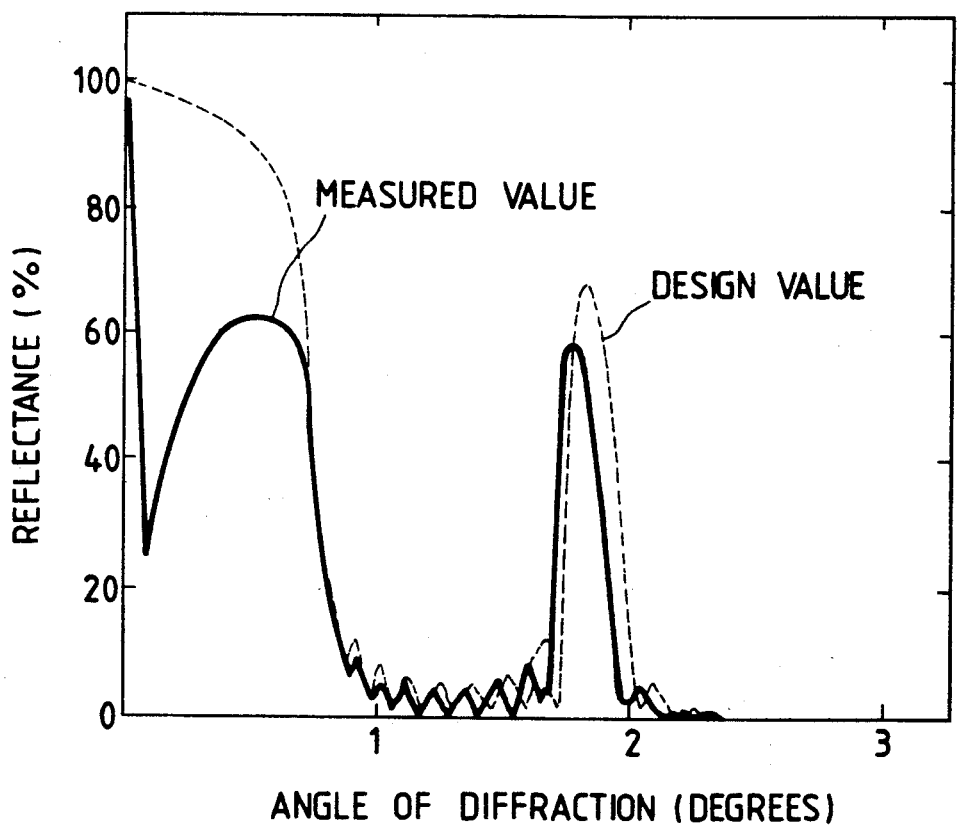
FIG. 2 is a view showing the comparison between the design value and the measured value of the reflectance, at a wavelength of 1.5 Å, of the multilayer film reflecting mirror having 11 layers of W and C.
Figure 3:
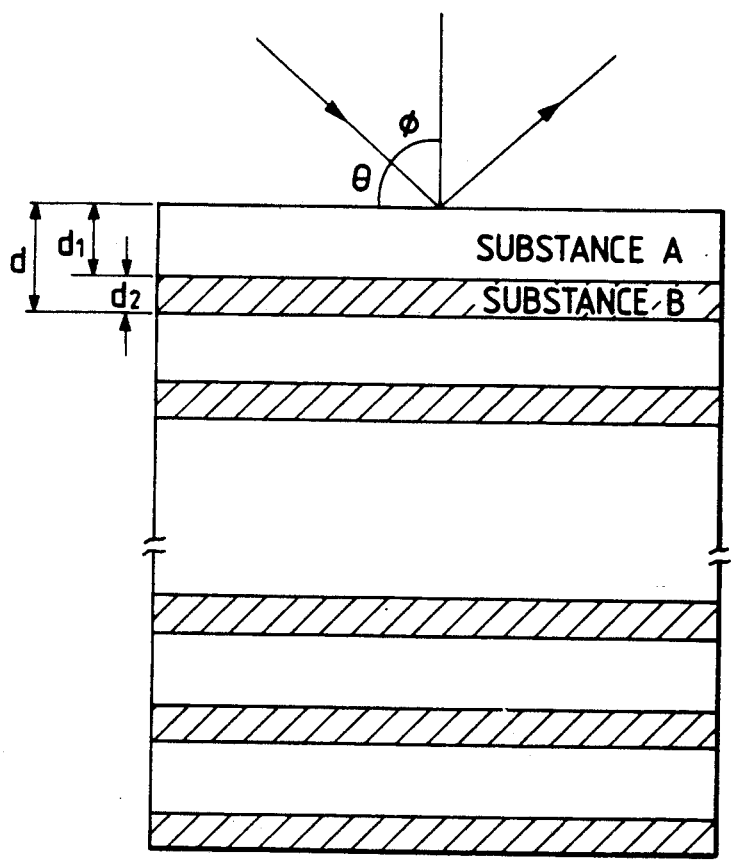
FIG. 3 is a view showing the structure of one example of multilayer film reflecting mirrors of the prior art.
Figure 4:
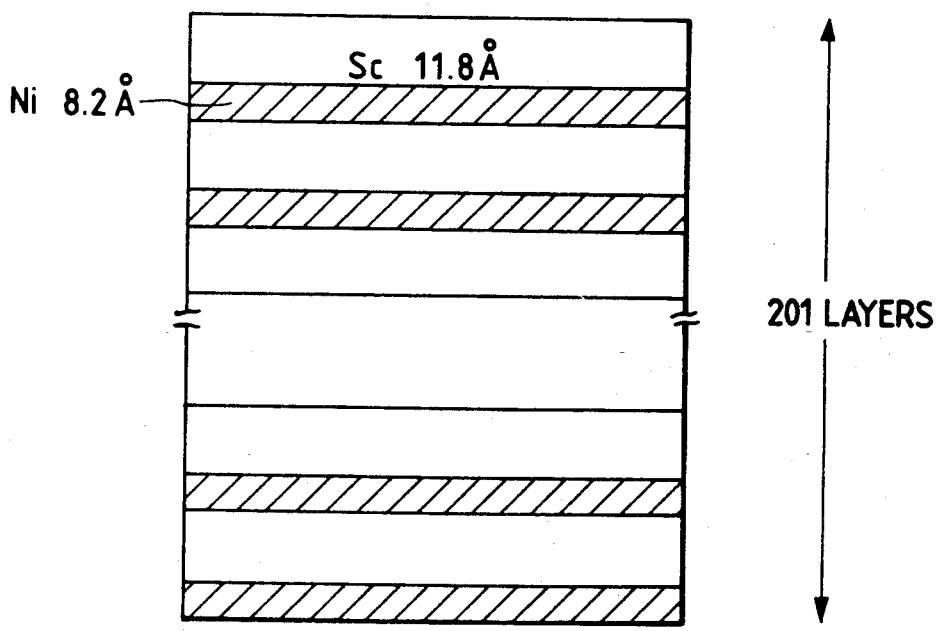
FIG. 4 is a view showing a design example of the multilayer film reflecting mirror having 201 layers of Ni and Sc.
Figure 5:
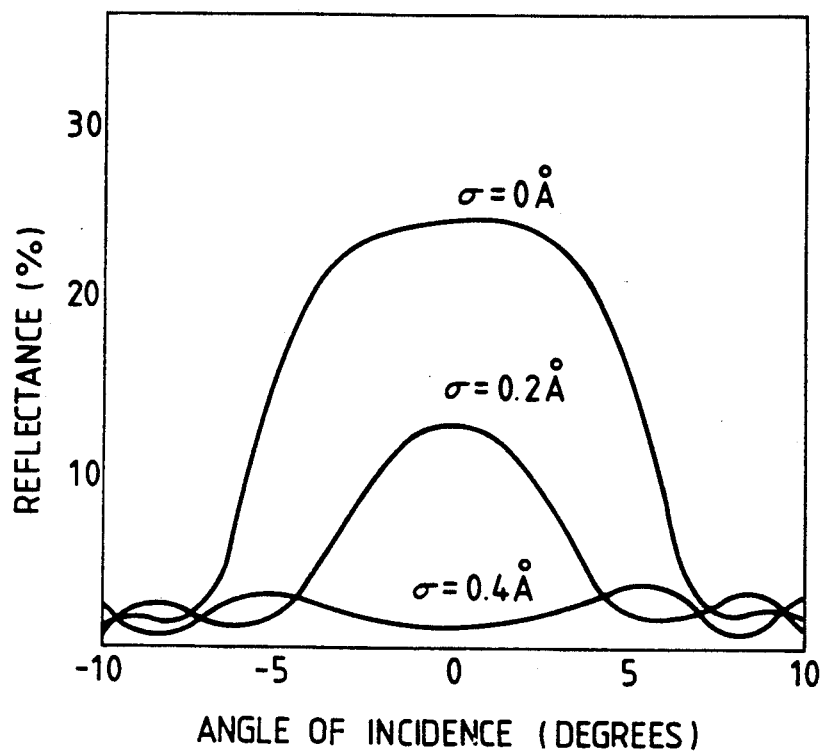
FIG. 5 is a view showing the simulation of the reflectance of the multilayer film reflecting mirror having 201 layers of Ni and Sc, with the change of tolerance of the film thickness.
Figure 6:
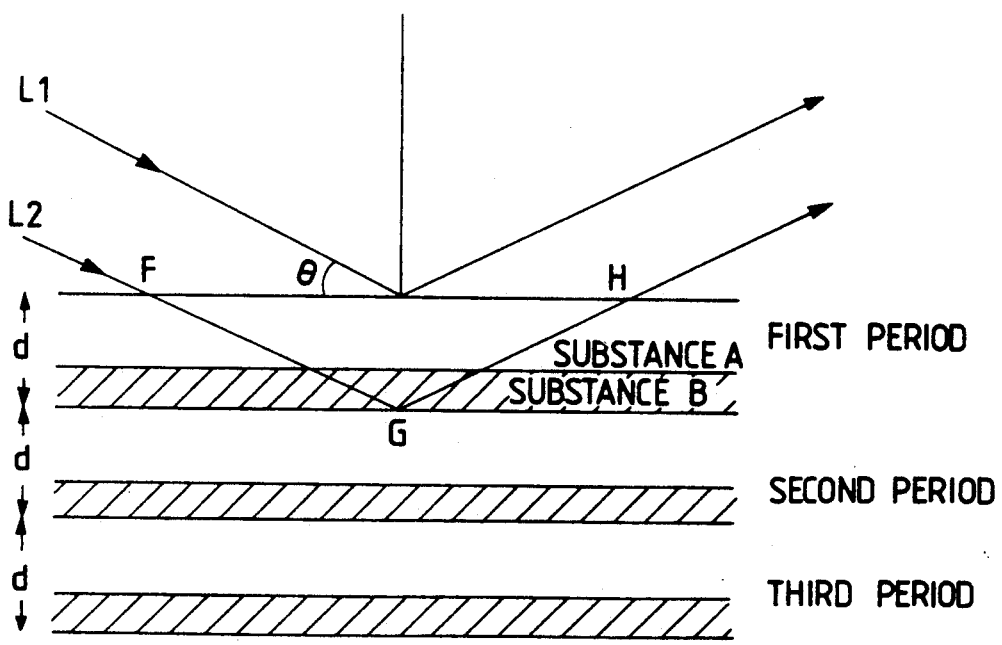
FIG. 6 is a conceptual view showing reflecting effects in the case where X rays are incident on the multilayer film reflecting mirror of an embodiment according to the present invention.
Figure 7A:
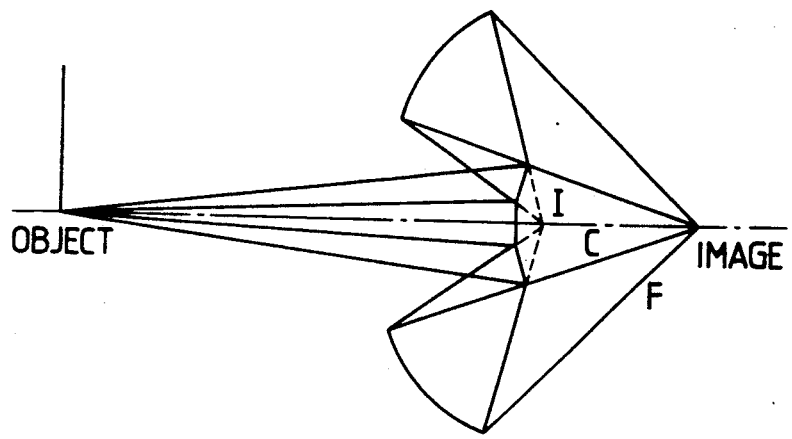
FIGS. 7A and 7B are views showing typical Schwarzschild and Walter optical systems.
Figure 7B:
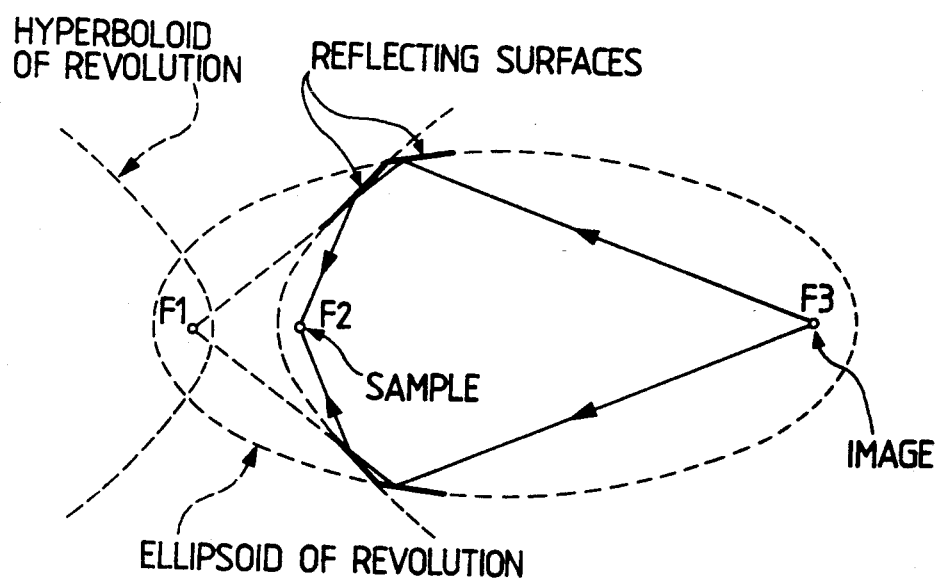

In accordance with the embodiments shown in the drawings, the present invention will be described in detail below.

FIRST EMBODIMENT

In this embodiment, where the multilayer film reflecting mirrors each comprised of Ni and Sc (the number of layers: 201, an X-ray wavelength: 39.8 Å) are fabricated within the tolerance defined by Equation (8), the deteriorative state of the reflectance against the optimum design value of the film thickness is simulated by changing in turn the film thickness of each layer of Ni and Sc, the incident angle $\phi$ of X rays, and a deviation SD from the optimum design value of the film thickness. The simulation is performed by the following procedure. That is, it is assumed that, with respect to 100 multilayer film reflecting mirrors, the tolerance of the film thickness is generated at random within the deviation SD in the probability according to the normal distribution given by Equation (7), and the reflectances of individual reflecting mirrors and their generation frequency (which is hereinafter called merely the frequency) are thus obtained. By Equation (1), the reflectance is calculated for each layer in regard to the film thickness deviated from the optimum design value. Also, the complex indices of refraction of Ni and Sc in the case of the X-ray wavelength of 39.8 Å are derived from the tables of atomic scattering factors by B. Henke [B. Henke, Atomic Data & Nuclear Data Tables 27, pp. 1-144 (1982)] and the literature [Sadao Aoki, Phys. Appl., Vol. 56, No. 3, pp. 16–18 (1981)], resulting in the following numerical data:

$$n(Ni) = 0.9882 - 0.0041183i$$

$$n(Sc) = 0.9975 - 0.0005738i$$

EMBODIMENT 1-1

Figure 8:
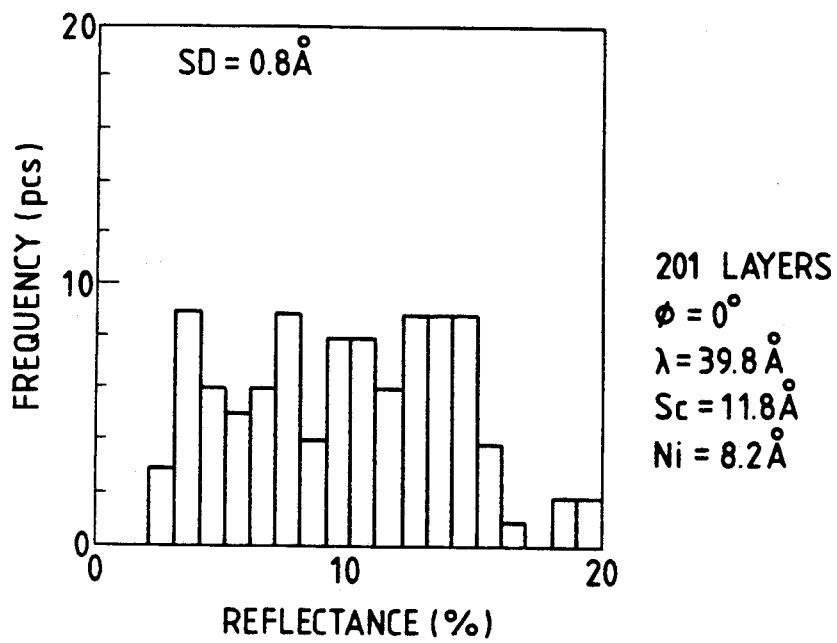
FIG. 8 is a view showing the simulation of the relationship between the reflectance and the frequency in Embodiment 1-1.

In this embodiment, the multilayer film reflecting mirrors are designed on the condition of normal incidence, namely, $\phi = 0°$. The film thickness of each Ni layer is 8.2 Å, that of each Sc layer 11.8 Å, and the deviation SD 0.8 Å. FIG. 8 shows the relationship between the reflectance and the frequency in Embodiment 1-1. The design value of the reflectance is 24%, and according to FIG. 8, the mirrors exhibiting the reflectances of a half (12%) of the design value or more are 36 ones, which indicates that Equation (8) is effective.

EMBODIMENT 1-2

Figure 9:
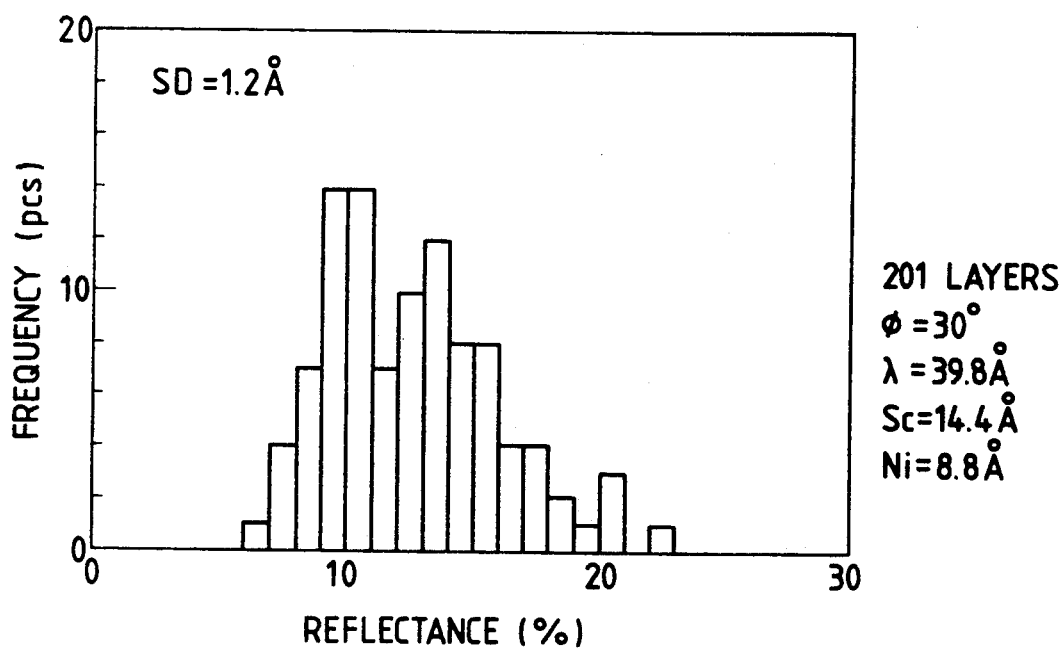
FIG. 9 is a view showing the simulation of the relationship between the reflectance and the frequency in Embodiment 1-2.

In this embodiment, the multilayer film reflecting mirrors are designed on the condition of $\phi = 30°$. The film thickness of each Ni layer is 8.8 Å, that of each Sc layer 14.4 Å, and the deviation SD 1.2 Å. FIG. 9 shows the relationship between the reflectance and the frequency in Embodiment 1-2. The design value of the reflectance is 28%, and according to FIG. 9, the mirrors exhibiting the reflectances of a half (14%) of the design value or more are 30 ones.

EMBODIMENT 1-3

Figure 10:
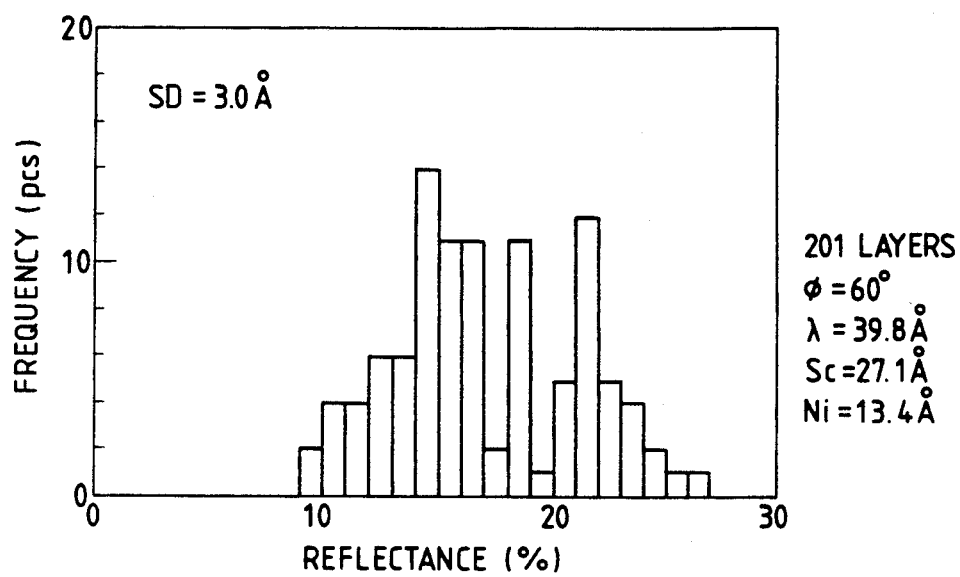
FIG. 10 is a view showing the simulation of the relationship between the reflectance and the frequency in Embodiment 1-3.

In this embodiment, the multilayer film reflecting mirrors are designed on the condition of $\phi = 60°$. The film thickness of each Ni layer is 13.4 Å, that of each Sc layer 27.1 Å, and the deviation SD 3.0 Å. FIG. 10 shows the relationship between the reflectance and the frequency in Embodiment 1-3. The design value of the reflectance is 36%, and according to FIG. 10, the mirrors exhibiting the reflectances of a half (18%) of the design value or more are 42 ones.

EMBODIMENT 1-4

Figure 11:
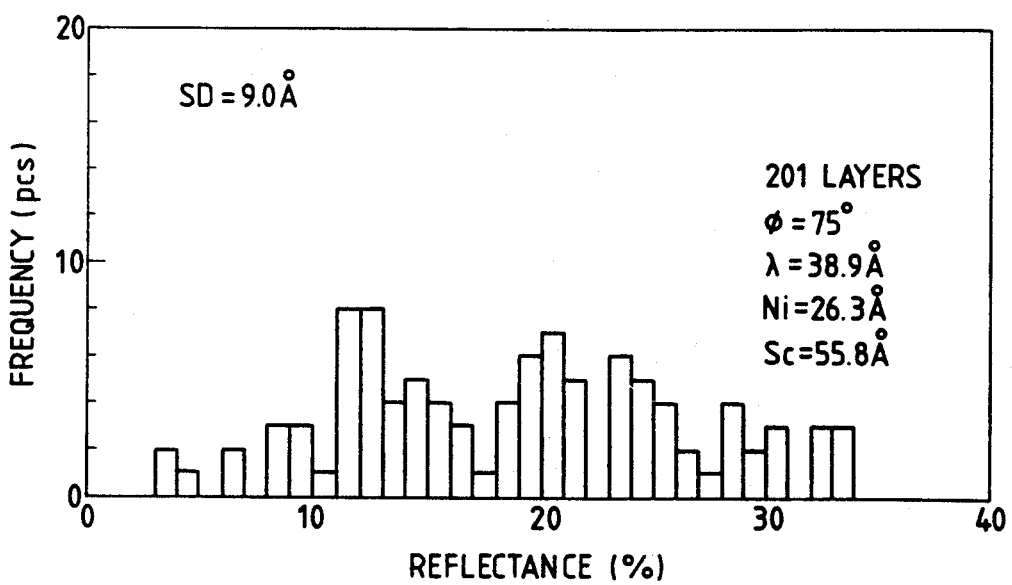
FIG. 11 is a view showing the simulation of the relationship between the reflectance and the frequency in Embodiment 1-3.

In this embodiment, the multilayer film reflecting mirrors are designed on the condition of $\phi = 75°$. The film thickness of each Ni layer is 26.3 Å, that of each Sc layer 55.8 Å, and the deviation SD 9.0 Å. FIG. 11 shows the relationship between the reflectance and the frequency in Embodiment 1-4. The design value of the reflectance is 39%, and according to FIG. 11, the mirrors exhibiting the reflectance of a half (20%) of the design value or more are 52 ones.

As mentioned above, according to the first embodiment, each deviation SD satisfies Equation (8) and hence the multilayer film reflecting mirror having a desired quality of reflection can be fabricated in the probability of 30% or more.

SECOND EMBODIMENT

In this embodiment, the states of the reflectances of the multilayer film reflecting mirrors each comprised of Ni and Sc (the number of layers: 101, the X-ray wavelength: 39.8 Å) are simulated like the first embodiment. Also, the optical constants are the same as in the first embodiment.

EMBODIMENT 2-1

Figure 12:
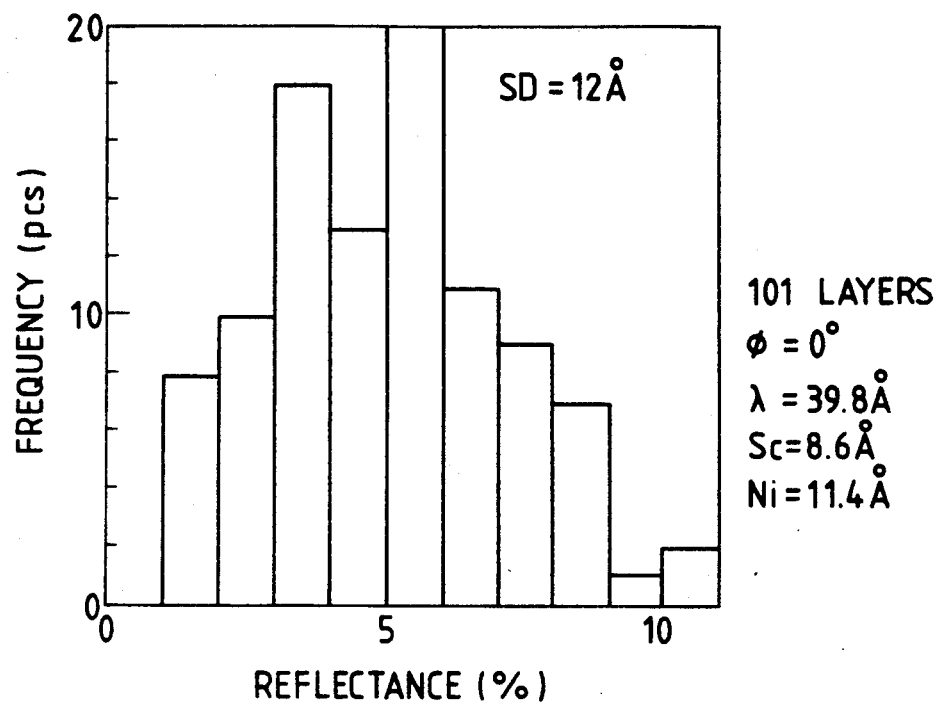
FIG. 12 is a view showing the simulation of the relationship between the reflectance and the frequency in Embodiment 2-1.

In this embodiment, the multilayer film reflecting mirrors are designed on the condition of $\phi = 0°$. The film thickness of each Ni layer is 8.6 Å, that of each Sc layer 11.4 Å, and the deviation SD 1.2 Å. FIG. 12 shows the relationship between the reflectance and the frequency in Embodiment 2-1. The design value of the reflectance is 11%, and according to FIG. 12, the mirrors exhibiting the reflectances of a half (6%) of the design value or more are 30 ones, which indicates that Equation (8) is effective.

EMBODIMENT 2-2

Figure 13:
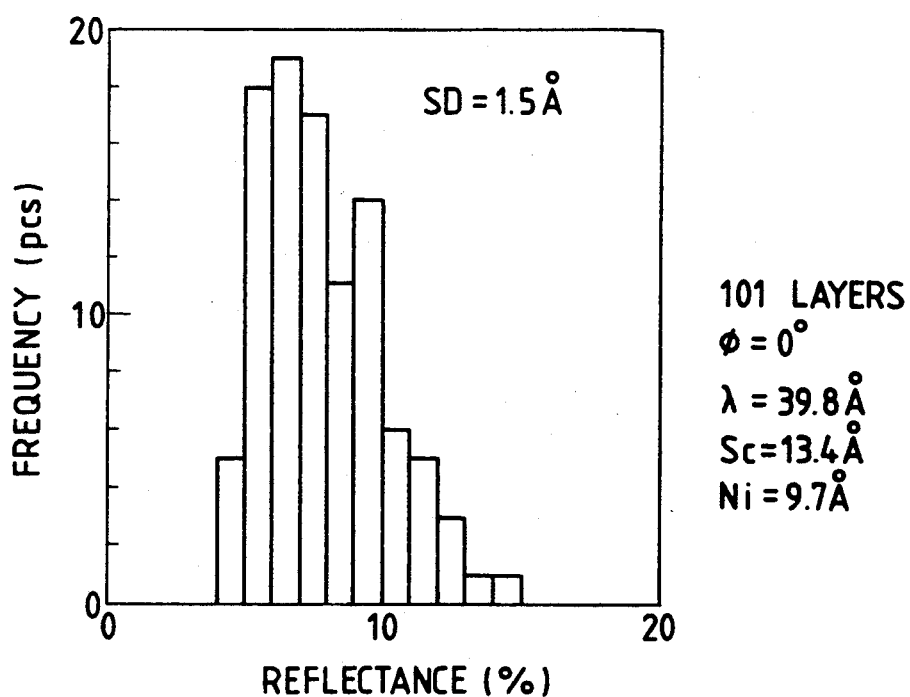
FIG. 13 is a view showing the simulation of the relationship between the reflectance and the frequency in Embodiment 2-2.

In this embodiment, the multilayer film reflecting mirrors are designed on the condition of $\phi = 30°$. The film thickness of each Ni layer is 9.7 Å, that of each Sc layer 13.4 Å, and the deviation SD 1.5 Å. FIG. 13 shows the relationship between the reflectance and the frequency in Embodiment 2-2. The design value of the reflectance is 14%, and according to FIG. 13, the mirrors exhibiting the reflectances of a half (7%) of the design value or more are 41 ones.

EMBODIMENT 2-3

Figure 14:
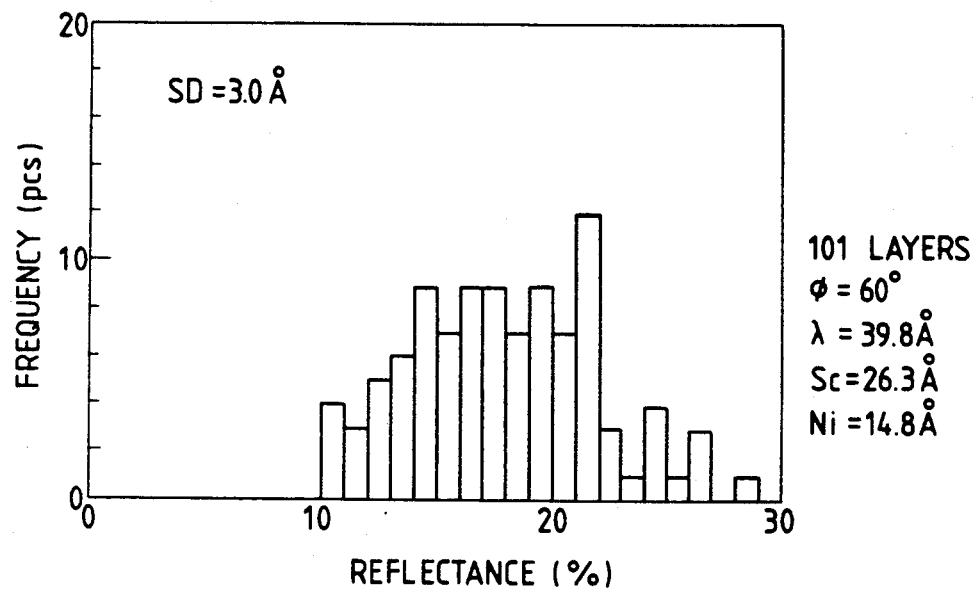
FIG. 14 is a view showing the simulation of the relationship between the reflectance and the frequency in Embodiment 2-3.

In this embodiment, the multilayer film reflecting mirrors are designed on the condition of $\phi = 60°$. The film thickness of each Ni layer is 14.8 Å, that of each Sc layer 26.3 Å, and the deviation SD 3.0 Å. FIG. 14 shows the relationship between the reflectance and the frequency in Embodiment 2-3. The design value of the reflectance is 34%, and according to FIG. 14, the mirrors exhibiting the reflectances of a half (17%) of the design value or more are 57 ones.

EMBODIMENT 2-4

Figure 15:
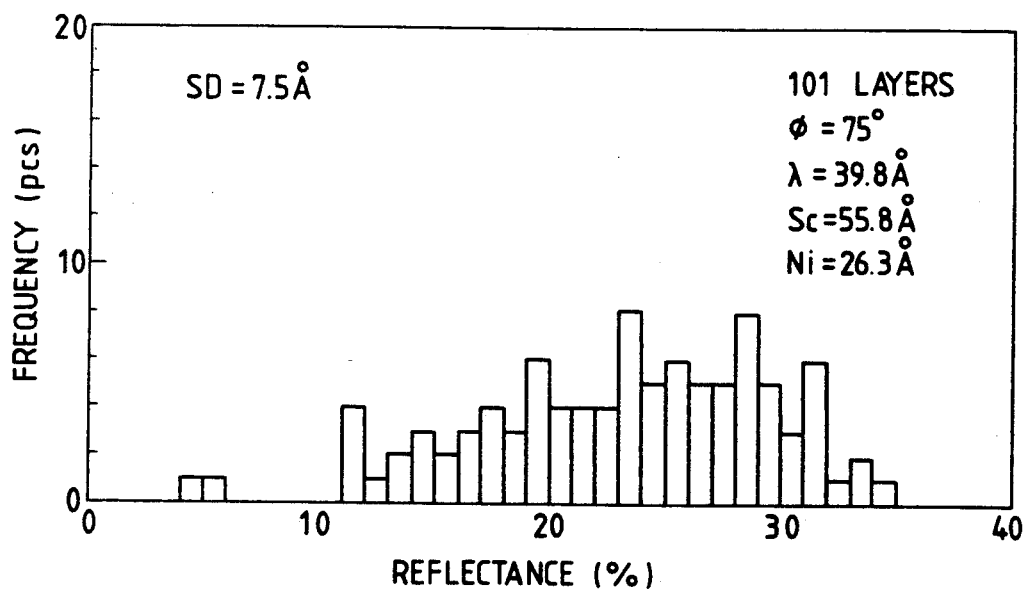
FIG. 15 is a view showing the simulation of the relationship between the reflectance and the frequency in Embodiment 2-4.

In this embodiment, the multilayer film reflecting mirrors are designed on the condition of $\phi = 75°$. The film thickness of each Ni layer is 26.3 Å, that of each Sc layer 55.8 Å, and the deviation SD 7.5 Å. FIG. 15 shows the relationship between the reflectance and the frequency in Embodiment 2-4. The design value of the reflectance is 39%, and according to FIG. 15, the mirrors exhibiting the reflectances of a half (20%) of the design value or more are 64 ones.

THIRD EMBODIMENT

In this embodiment, the states of the reflectances of the multilayer film reflecting mirrors each comprised of Re (rhenium) and Al (aluminum) (the number of layers: 41, the X-ray wavelength: 210 Å) are simulated by the same procedure as in the above embodiments. The incident angle is set at $\phi = 15°$, the film thickness of each Re layer is 28.3 Å, and that of each Al layer is 80 Å. Also, the optical constants of Re and Al are cited from the literature [Takeshi Namioka et al., "Developments of Light Sources and Optical systems for Soft X-ray Lithography", Report of Research by Scientific Research-Aid Fund for the 1985 Fiscal Year (Test Research (2)), pp. 1-36, 1986], resulting in the following numerical data:

$$n(Re) = 0.65 - 0.12i$$

$$n(Al) = 0.99 - 0.00458i$$

Figure 16:
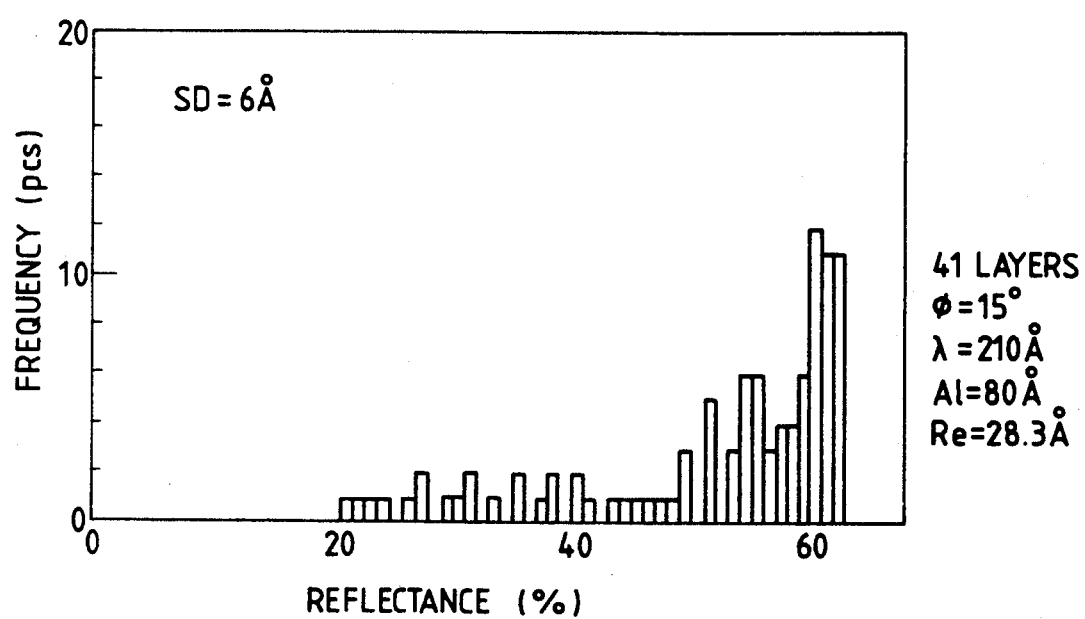
FIG. 16 is a view showing the simulation of the relationship between the reflectance and the frequency in a third embodiment.

FIG. 16 shows the relationship between the reflectance and the frequency in the third embodiment in which the deviation SD is 6.0 Å. The design value of the reflectance is 64%, and according to FIG. 16, the mirrors exhibiting the reflectances of a half (32%) of the design value or more are 87 ones, which indicates that Equation (8) is effective.

What is claimed is:

1. A multilayer film reflecting mirror comprising layers of a plurality of substances constructed on a substrate, suited for X rays having wavelengths of 100 Å and less, wherein a deviation $\Delta$ from a standard value of thickness of each layer is within a range defined by $$\left| \frac{0.03}{\sin^2 \theta} \lambda \right| \geq \Delta$$

where $\theta$ is the grazing angle of an X ray incident on the reflecting mirror and $\lambda$ is the wavelength of the X ray.

2. The reflecting mirror according to claim 1, wherein said plurality of substances is comprised of Ni and Sc, and said layers are alternately laminated on the substrate so that a multilayer film is fabricated.

3. The reflecting mirror according to claim 1, wherein said plurality of substances is comprised of Re and Al, and said layers are alternately laminated on the substrate so that a multilayer film is fabricated.

4. The reflecting mirror according to claim 1, wherein said plurality of substances is comprised of W and C, and said layers are alternately laminated on the substrate so that a multilayer film is fabricated.

5. The reflecting mirror according to claim 1, wherein at least one of said plurality of substances is comprised of Ni, and said layers are alternately laminated on the substrate so that a multilayer film is fabricated.

6. The reflecting mirror according to claim 1, wherein said substrate has a curvature.

7. The reflecting mirror according to claim 1, wherein said reflecting mirror constitutes a Schwarzschild optical system.

8. The reflecting mirror according to claim 1, wherein said reflecting mirror constitutes a Walter optical system.

* * * * *